Patented July 29, 1941

2,251,007

UNITED STATES PATENT OFFICE 2,251,007

MACHINING TOOL

Karl Schröter, Berlin-Lichtenberg, and Walther Dawihl, Berlin-Kohlhasenbruck, Germany, assignors to General Electric Company, a corporation of New York No Drawing. Application September 3, 1938, Serial No. 228,452. In Germany September 6, 1937

3 Claims. (Cl. 29—95)

This invention relates to machining tools, in particular those intended for machining insulating material.

In machining insulating material, for example cutting, turning, drilling, planing, milling and the like, tools frequently are used the operative part of which consists either of oxides only, for example aluminum oxide and magnesium oxide in connection with silicic acid or of mixtures of oxides with metallic binders, for example of aluminum oxide with iron. Furthermore, tools frequently are used in which oxides constitute the binder for other hard material, such as silicon carbide. Serious difficulties are encountered in many cases in fixing such oxiceramic or oxiceramically bound tool tips to a tool shank consisting of steel or any other suitable metal, because the solders generally used with hard metal tools and consisting of copper, brass or bronze do not give a firm bond with oxiceramic or oxiceramically bound tool tips. For this reason any additional mechanical fastening means always had to be provided.

The present invention has for its object a very simple but very solid connection between a metallic shank and tips which substantially or entirely consist of oxides or containing oxides as binder. According to the invention the tip is fixed to the shank by means of a glass solder which contains cobalt oxide, nickel oxide or manganese oxide or several of these oxides. A glass solder containing oxides of this class shows a very high adhesive strength when applied to metals, particularly iron, and owing to its glass-like nature also adheres easily and firmly to oxiceramic or oxiceramically bound tips.

A suitable composition of a glass solder to be employed according to the invention is the following:

| | Per cent by weight |
|---|---|
| Borax | 40 |
| Quartz | 25 |
| Feldspar | 25 |
| Sodium carbonate | 6 |
| Potassium nitrate | 3 |
| Cobalt oxide | 0.5 |
| Nickel oxide | 0.5 |

This mixture is melted and subsequently ground. The place of junction on the tool shank is then painted with the paste thus obtained and when the paste has dried, the tip to be fixed such as a cutting tip, is put thereonto, whereupon the whole is heated a short time, say some minutes, at a temperature of about 850° C. The glass solder fuses at this temperature and firmly connects the shank with the tip.

When the coefficient of expansion of the tip differs too much from that of the shank material, one or more glass layers may be provided between the glass solder applied to the shank and the tip, the coefficients of expansion of which glass layers lie between that of the glass solder and of the tip.

What we claim and desire to secure by Letters Patent is:

1. A tool of the type described comprising a metallic shank and a tip prepared at least mainly of oxides or containing oxides as binder, said tip being fixed to the shank by means of a glass solder containing at least one of the following oxides: cobalt oxide, nickel oxide, manganese oxide.

2. A tool as specified in claim 1, in which between the shank and the glass solder applied thereto is provided at least one glass layer the coefficient of expansion of which lies between that of the shank and of the tip.

3. In a tool comprising a shank and a cutting tip which consists principally of one or more oxides, means for securing the tip to the shank, said means consisting of a glass solder containing one or more oxides from the group cobalt oxide, nickel oxide and manganese oxide.

KARL SCHRÖTER.
WALTHER DAWIHL.